United States Patent [19]
Simoni

[11] Patent Number: 5,149,146
[45] Date of Patent: Sep. 22, 1992

[54] DOUBLE KNUCKLE JOINT FOR A WIDE RANGE ORIENTATION OF A LIQUID DISTRIBUTOR WITH RESPECT TO A FEEDER PIPE

[75] Inventor: Giancarlo Simoni, Genova, Italy

[73] Assignee: Siroflex S.r.l, Italy

[21] Appl. No.: 496,775

[22] Filed: Mar. 21, 1990

[30] Foreign Application Priority Data

Dec. 4, 1989 [IT] Italy .................. 12606 A/89

[51] Int. Cl.[5] .................................... F16L 27/04
[52] U.S. Cl. ................................. 285/166; 285/261; 403/56
[58] Field of Search ............. 403/56, 53; 285/272, 285/166, 167, 261, 921

[56] References Cited

U.S. PATENT DOCUMENTS

| | | | |
|---|---|---|---|
| 1,015,435 | 1/1912 | Greenlaw et al. | 285/166 X |
| 1,500,921 | 7/1924 | Bramson et al. | 403/56 X |
| 1,914,736 | 6/1933 | Coutu . | |
| 1,985,502 | 12/1934 | Isenberg | 285/261 X |
| 2,564,938 | 8/1951 | Warren | 285/261 X |
| 2,971,701 | 2/1961 | Shames et al. . | |
| 3,033,596 | 5/1962 | Pearring | 285/261 |
| 3,145,932 | 8/1964 | Mango | 285/261 X |
| 3,669,470 | 6/1972 | Deurloo | 285/166 X |
| 3,712,645 | 1/1973 | Herter | 285/166 X |

FOREIGN PATENT DOCUMENTS

| | | |
|---|---|---|
| 1034432 | 7/1958 | Fed. Rep. of Germany . |
| 204981 | 12/1983 | Fed. Rep. of Germany . |
| 102345 | 11/1916 | United Kingdom . |

*Primary Examiner*—Peter M. Cuomo
*Attorney, Agent, or Firm*—Rosenman & Colin

[57] ABSTRACT

A double knuckle joint comprises a hollow shaft provided at its two ends with ball members and two ring nuts surrounding the ball members for connecting the joint to a feed pipe as well as to a distributor such as a shower head which can then be moved or swivelled through a large angle relative to the feed pipe.

12 Claims, 2 Drawing Sheets

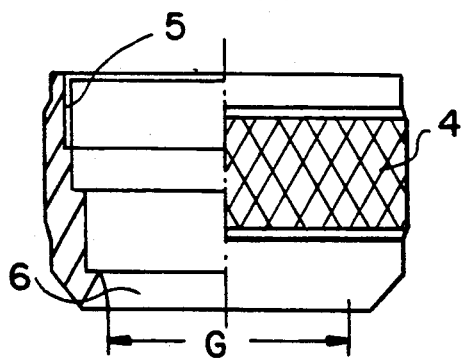
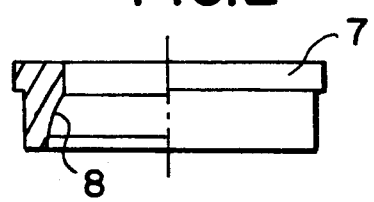
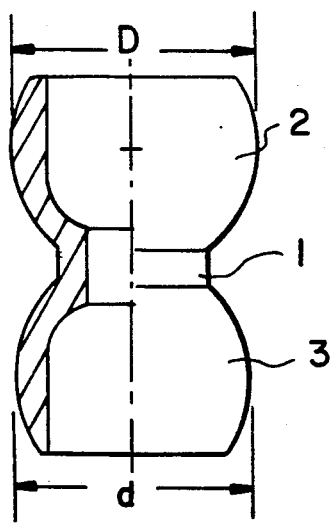
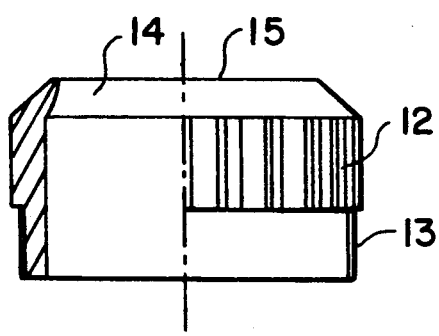
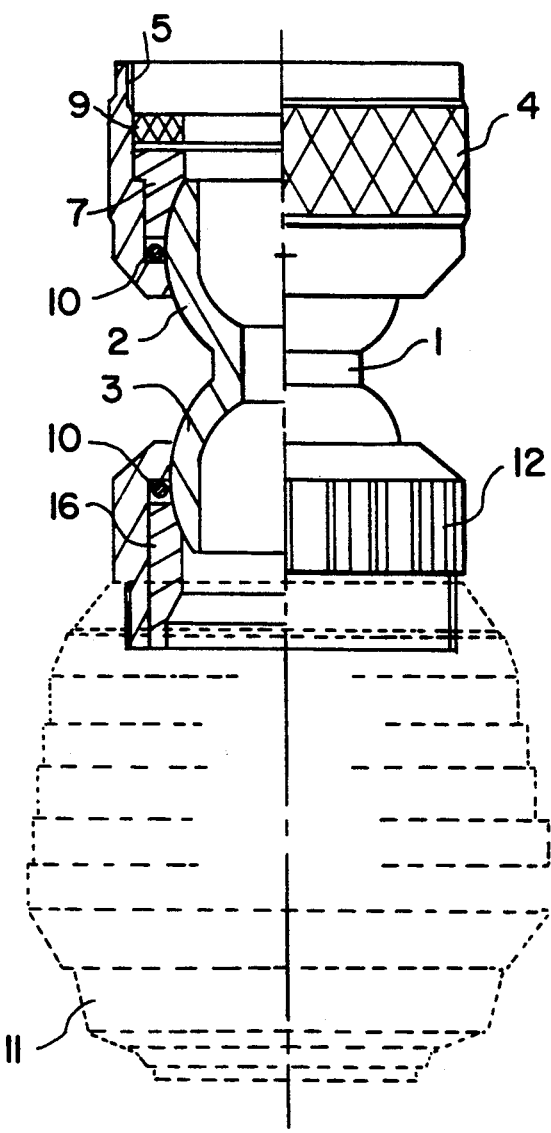
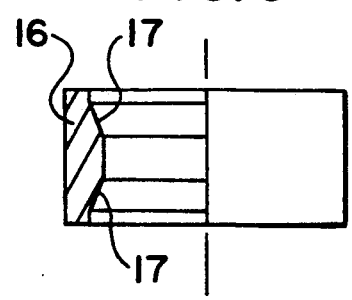

DOUBLE KNUCKLE JOINT FOR A WIDE RANGE ORIENTATION OF A LIQUID DISTRIBUTOR WITH RESPECT TO A FEEDER PIPE

BACKGROUND OF THE INVENTION

This invention relates to an improved knuckle joint designed to permit swivelling of a liquid distributor through a large angle with respect to a feed pipe or supply valve to which the knuckle joint is also connected.

Several distributors are known, such as fixed or telephone showers for bathrooms, kitchens, etc., sprinklers, irrigation nozzles, wash brushes, etc., all fed by pipes, valves or faucets.

Since these distributors all have a rigid body and since the delivery pipe or valve is also fixed, an articulated or flexible joint is necessary to permit free movement of such distributors with respect to the supply source. Flexible hoses of different types are known for connecting such distributors to such feed pipes but they have the drawback that they are very cumbersome and short-lived. Furthermore, there are also known several types of articulated joints which, although less cumbersome than flexible hoses, permit only a very limited movement and orientation of the distributor. These known devices permit the distributor to move so that its directrix defines a cone angle of only 30° with respect to the feed pipe or valve axis.

OBJECT OF THE INVENTION

An object of the invention is to provide an improved articulated joint for use between a distributor and a feed pipe whereby the directrix cone angle of the distributor can be adjusted through angles of up to 65°, 130°, 195°. etc., in a manner yet to be explained.

SUMMARY OF THE INVENTION

This object is achieved in accordance with this invention by a knuckle joint comprising a hollow shaft provided with two spherical ball members at its ends, a first union or ring nut for connection to the feed pipe and a second union or ring nut for connection to the distributor. This arrangement permits the distributor to be swivelled through an angle of up to about 65°.

A 130° swivel angle can be obtained by connecting two such double knuckle joints together and this range can be extended to about 195° by using three such joints.

The joint in accordance with this invention also permits stable positioning of the distributor with respect to the feed pipe or valve in any desired position, without any support, since the resistance against any change of position will keep the distributor in a stable position which can, however, easily be adjusted by hand. This is, however, not possible when flexible hoses are used to change the direction of the distributor, since they always require proper supporting structures or manual support.

The joint of the invention requires little space, provides a perfect seal and has a virtually unlimited life because of its sturdy components.

The various features of novelty which characterize the invention are pointed out with more particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

The invention will now be described merely by way of illustration with reference to the accompanying drawings in which:

FIG. 1 is a side elevation partly in section of a first ring nut of rigid material used for connecting a double knuckle joint according to one embodiment of this invention to a supply pipe or valve;

FIG. 2 is a side view partly in section of a ring by which a first ball member forming part of the double knuckle joint is fitted into the first ring nut shown in FIG. 1;

FIG. 3 is a side view partly in section of a double ball member as used in this first embodiment;

FIG. 4 is a side view partly in section of a second ring nut of a compressible material used for connecting the knuckle joint to a discharge means;

FIG. 5 is a side view partly in section of a stop ring used for securing a second ball member forming a part of the double knuckle joint in a second socket;

FIG. 6 is a side view partly in section of this first embodiment of a double knuckle joint complete with a discharge means in the form of a shower or sprinkler head;

DESCRIPTION OF THE PREFERRED EMBODIMENTS

Figure 7:
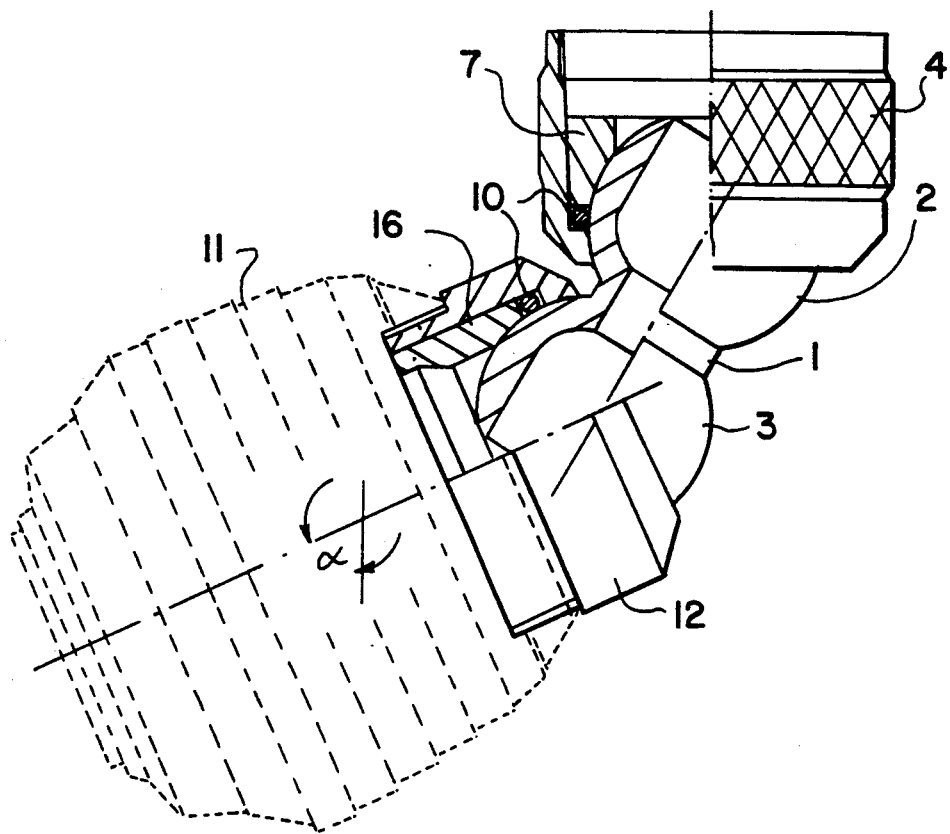
FIG. 7 is a side view partly in section of the knuckle joint of FIG. 6 when swivelled into a different angular position.

The first embodiment of the invention, in which a first ring nut 4 of the knuckle joint for fitting to a feed pipe or valve is formed of a rigid material, is illustrated in FIGS. 1 to 7.

The knuckle joint shown in these figures comprises a hollow shaft 1 having an axial bore and formed at its ends with two ball members 2 and 3 having slightly different diameters. In particular, the first ball member 2 has a larger diameter D than the diameter d of the second ball member 3. The first ring nut 4 is formed of a rigid material and connects the knuckle joint to the feed valve or pipe by means of its internal thread 5. At the end opposite to the thread 5, this ring nut 5 has an inwardly projecting annular lip 6 having an internal diameter G intermediate the diameters D and d of the two ball members.

The hollow shaft 1 is inserted from above through the first ring nut 4. The second ball member 3 with its smaller diameter passes through the annular lip 6, while the first ball member 2 with its larger diameter is retained within the first ring nut 4 and is locked therein by a ring 7 having an oblique annular inner surface 8 acting, together with the annular shape of the lip 6, to provide a rotation socket for the ball member 2. The ring 7 is in turn held within the ring nut 4 by packing 9 and the end of the feed pipe or valve (not shown).

An annular seal or O-ring 10 is fitted between the lip 6 of the ring nut 4, the ring 7 and the first ball member 2.

A second ring nut 12 of compressible, e.g. plastic, material provides for connection of the knuckle joint to a distributor, such as a shower head, 11 by means of an external thread 13. This second ring nut 12 has an annular inwardly projecting lip 14 defining a bore 15 having a slightly smaller diameter than the second ball member 3. The latter can, however, be pressed into the second ring nut 12 through the lip 14 by elastic deformation of the lip 14.

The ball member 3, when fitted into the second ring nut 12, is blocked by a second or inner ring 16 featuring two oblique internal annular surfaces 17, one of which acts, together with annular lip 14, as a socket for the swivelling ball member 3. The ring 16 is kept in place by the distributor 11 and its gasket (not shown) mounted on the ring nut 12. A second annular seal or O-ring 10 is disposed between the second ring nut 12, the inner ring 16 and the ball member 3.

The double knuckle joint is illustrated in FIG. 6 together with a typical distributor such as a shower or sprinkler head. Obviously, such a shower head can be replaced by any other type of distributor, such as a nozzle, sprinkler, wash brush or even by a discharge pipe.

FIG. 7 shows the same assembly as illustrated in FIG. 6 but shows the distributor 11 rotated through an angle α ranging between 0° and 65°.

It will be understood that two such double articulated knuckle joints can be fitted between a feed pipe and a distributor to permit the distributor to be rotated through 0° to 130°, while three such double joints will permit swivelling between 0° and 195° with respect to the feed pipe.

The double articulated knuckle joint forming the subject matter of this invention occupies very little space—much less than that required for known flexible couplings. Its components are sturdy and perfectly sealed and the distributor can be swivelled within a rather wide range.

Figure 8:
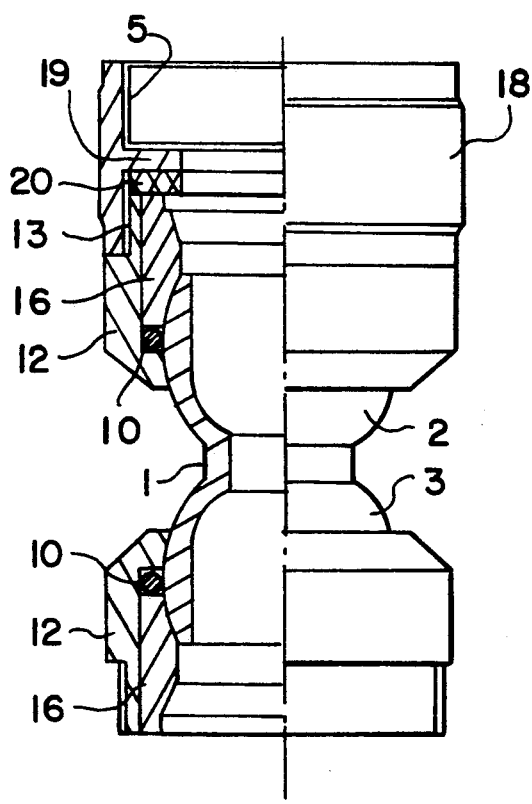
FIG. 8 is a side view partly in section and similar to that of FIG. 6 but showing an alternative embodiment in which the first ring nut for connecting the joint to a feed pipe is also partially formed of a compressible material.

A second embodiment of a knuckle joint in accordance with this invention is illustrated in FIG. 8. In this embodiment, the first ring nut to be connected to the feed pipe comprises two parts 12 and 16 identical to those forming the second ring nut 12 and inner ring 16 as illustrated for the first embodiment as shown in FIGS. 4 and 5.

A ring 18, provided with an internal thread 5, is connected to the feed pipe (not shown) and is engaged by the external thread 13 of the ring nut 12. The ring 18 is also provided with an annular internal flange 19 holding a gasket 20 in place.

In this second embodiment, it will be noted that the first and second ring nuts have the same components 12 and 16 formed of a compressible plastics material, whereas the ring 18 is formed of a rigid material for connecting the knuckle joint to the feed pipe. Consequently, the ball members 2 and 3 can have the same diameter "d" and can be mounted in the ring nuts by snapping them, by elastic deformation, through the bores 15 in the lips 14, as already described for the second ring nut of the first embodiment as shown in FIGS. 1 to 7.

This second embodiment, which form a manufacturing point of view is somewhat simpler than the first embodiment, has the advantage that the knuckle joint can be swivelled in any one direction between the distributor 11 and the ring connecting it to the feed pipe whereas, in the first embodiment, an exact orientation of the two ball members 2 and 3 must be observed with respect to the two different ring nuts 4 and 12.

The foregoing is a description of a preferred embodiment of the invention which is given here by way of example only. The invention is not to be taken as limited to any of the specific features as described but comprehends all such variations thereof as come within the scope of the appended claims.

The embodiments of the invention in which an exclusive property or privilege is claimed are defined as follows:

1. A pipe joint assembly, comprising: an adjustable pipe joint including
   (A) a one-piece, hollow sleeve extending along a longitudinal axis between opposite end faces and having a pair of generally ball-shaped end portions spaced longitudinally apart of each other, and a cylindrical central portion intermediate, and integral with, the ball-shaped end portions, each ball-shaped end portion having an outer diameter as considered along a transverse axis normal to the longitudinal axis, said outer diameters of the ball-shaped end portions being different in magnitude, said ball-shaped end portions and said central portion together bounding an internal fluid flow passage that extends along the longitudinal axis between the end faces of the sleeve;
   (B) inlet connector means for connecting one of the ball-shaped end portions to a fluid feed means, said inlet connector means including
      (i) an annular, hollow, inlet outer member of rigid material and extending along a first axis and circumferentially surrounding said one ball-shaped end portion, said inlet member having an annular lip extending radially inwardly of the first axis to bound a first circular opening having a diameter smaller than the outer diameter of said one ball-shaped end portion and greater than the outer diameter of said other ball-shaped end portion, said lip having a first, concave, inner circumferential surface,
      (ii) an annular, hollow, inlet locking ring mounted entirely within the inlet member and having a first, concave, inner, circumferential wall which, together with the first, inner, circumferential surface of said lip, form a generally spherical first socket for rotatably receiving said one ball-shaped end portion to orient said first axis in a range of inclination angles relative to said longitudinal axis, said first, concave, inner, circumferential wall extending substantially to the end face of said one ball-shaped end portion to increase the range of the inclination angles, and
      (iii) an inlet seal mounted in sealing engagement among the inlet member, the inlet locking ring and said one ball-shaped end portion; and
   (C) outlet connector means for connecting the other of the ball-shaped end portions to a fluid discharge means, said outlet connector means including
      (i) an annular, hollow, outlet outer member of resilient material and extending along a second axis and circumferentially surrounding said other ball-shaped end portion, said outlet member having an annular flange extending radially inwardly of the second axis to bound a second circular opening having a diameter smaller than the outer diameter of said other ball-shaped end portion, said outlet member resiliently engaging said other ball-shaped end portion, said flange having a second, concave, inner, circumferential surface, (ii) an annular, hollow, outlet locking ring mounted within the outlet member and having a second, concave, inner, circumferential wall which, together with the second, inner, circumferential surface of said flange, form a generally spherical second socket for rotatably receiving said other ball-shaped end portion to orient said second axis in a range of inclination angles relative to said longitudinal axis, said second, concave, inner, circumferential wall extending substantially to the end face on said other ball-shaped end portion to increase the range of the inclination angles, and (iii) an outlet seal mounted in sealing engagement among the outlet member, the outlet locking ring and said other ball-shaped end portion.

2. The joint as claimed in claim 1, wherein the inlet member has an interior threaded portion for threadedly engaging the fluid feed means, and wherein the inlet member and the inlet locking ring extend along the first axis past the end face on said one ball-shaped end portion.

3. The joint as claimed in claim 2, wherein the inlet connector means includes a packing within the inlet member axially adjacent the inlet locking ring.

4. The joint as claimed in claim 1, wherein the outlet member has an exterior threaded portion for threadedly engaging the fluid discharge means, and wherein the outlet member and the outlet locking ring extend along the second axis past the end face on said other ball-shaped end portion.

5. The joint as claimed in claim 4, wherein the outlet locking ring has another, concave, inner, circumferential wall spaced along the second axis apart from said second, concave, inner, circumferential wall.

6. The joint as claimed in claim 1, wherein the inclination angles included between the first and second axes range from 0° to 65°.

7. The joint as claimed in claim 1, wherein additional pipe joints identical to said first-mentioned pipe joint are interconnected to further increase the range of the inclination angles.

8. A method of assembling an adjustable pipe joint, comprising the steps of:
(A) forming a one-piece, hollow sleeve along a longitudinal axis with a pair of generally ball-shaped end portions spaced longitudinally apart of each other, each ball-shaped end portion having an outer diameter as considered along a transverse axis normal to the longitudinal axis, said sleeve being formed with an internal fluid flow passage that extends longitudinally through the sleeve; and
(B) mounting a pair of connectors on the ball-shaped end portions, at least one of the connectors including an annular, hollow, outer member of resilient material having an annular projection extending radially inwardly of a connector axis to bound a circular opening having a diameter smaller than the outer diameter of one of the ball-shaped end portions, said mounting step including the step of inserting said one ball-shaped end portion into and resiliently spreading the circular opening, the step of locking the outer member onto said one ball-shaped end portion by mounting a locking ring entirely within the outer member, and the step of sealing the outer member, said one ball-shaped end portion, and the locking ring, said mounting step further including the step of forming a generally spherical socket on the locking ring and the outer member to rotatably receive said one ball-shaped end portion, wherein the other of the connectors has an outer circular opening having a predetermined diameter and an inner circular opening having a diameter smaller than said predetermined diameter; and further comprising the step of inserting the sleeve along the longitudinal axis through the outer opening with clearance.

9. The method as claimed in claim 8, wherein the other of the ball-shaped end portions is inserted into, and resiliently spreads apart, a circular opening of another of the connectors.

10. A pipe joint assembly, comprising: an adjustable pipe joint including
(A) a one-piece, hollow sleeve of rigid material extending along a longitudinal axis between opposite end faces and having a pair of generally ball-shaped end portions spaced longitudinally apart of each other, and a cylindrical central portion intermediate, and integral with, the ball-shaped end portions, each ball-shaped end portion having an outer diameter as considered along a transverse axis normal to the longitudinal axis, said outer diameters of the ball-shaped end portions being equal in magnitude, said ball-shaped end portions and said central portion together bounding an internal fluid flow passage that extends along the longitudinal axis between the end faces of the sleeve;
(B) inlet connector means for connecting one of the ball-shaped end portions to a fluid feed means, said inlet connector means including
  (i) an annular, hollow, inlet outer member of resilient material and extending along a first axis, said inlet member circumferentially surrounding and resiliently engaging said one ball-shaped end portion, said inlet member having an annular lip extending radially inwardly of the first axis to bound a first circular opening having a diameter smaller than the outer diameter of said one ball-shaped end portion, said lip having a first, concave, inner circumferential surface,
  (ii) an annular, hollow, inlet locking ring mounted entirely within the inlet member and having a first, concave, inner, circumferential wall which, together with the first, inner, circumferential surface of said lip, form a generally spherical first socket for rotatably receiving said one ball-shaped end portion to orient said first axis in a range of inclination angles relative to said longitudinal axis, said first, concave, inner, circumferential wall extending substantially to the end face on said one ball-shaped end portion to increase the range of the inclination angles, and
  (iii) an inlet seal mounted in sealing engagement among the inlet member, the inlet locking ring and said one ball-shaped end portion; and
(C) outlet connector means for connecting the other of the ball-shaped end portions to a fluid discharge means, said outlet connector means including
  (i) an annular, hollow, outlet outer member of resilient material and extending along a second axis, said outlet member circumferentially surrounding and resiliently engaging said other ball-shaped end portion, said outlet member having an annular flange extending radially inwardly of the second axis to bound a second circular opening having a diameter smaller than the outer diameter of said other ball-shaped end portion, said flange having a second, concave, inner, circumferential surface, (ii) an annular, hollow, outlet locking ring mounted within the outlet member and having a second, concave, inner, circumferential wall which, together with the second, inner, circumferential surface of said flange, form a generally spherical second socket for rotatably receiving said other ball-shaped end portion to orient said second axis in a range of inclination angles relative to said longitudinal axis, said second, concave, inner, circumferential wall extending substantially to the end face on said other ball-shaped end portion to increase the range of the inclination angles, and (iii) an outlet seal mounted in sealing engagement among the outlet member, the outlet locking ring and said other ball-shaped end portion.

11. The joint as claimed in claim 10, wherein the inlet member includes a first, resilient part that circumferentially surrounds said one ball-shaped end portion, and a second, rigid part spaced along the first axis away from the first part past the end face on said one ball-shaped end portion.

12. The joint as claimed in claim 11, wherein the second part includes a transverse wall, and wherein the inlet connector means includes a packing between the transverse wall and the first part.

* * * * *